(12) United States Patent
Liao et al.

(10) Patent No.: US 6,915,527 B2
(45) Date of Patent: Jul. 5, 2005

(54) AUTO-BALANCING APPARATUS HAVING BALANCER CLAMPING MECHANISM FOR OPTICAL DISK DRIVES

(75) Inventors: Cheng-Yao Liao, Taipei (TW); Tzu-Nan Chen, Taipei (TW)

(73) Assignee: Lite-on IT Corporation, Taipei (TW)

( * ) Notice: Subject to any disclaimer, the term of this patent is extended or adjusted under 35 U.S.C. 154(b) by 279 days.

(21) Appl. No.: 10/242,782

(22) Filed: Sep. 13, 2002

(65) Prior Publication Data

US 2004/0052200 A1 Mar. 18, 2004

(51) Int. Cl.[7] .............................................. G11B 19/20
(52) U.S. Cl. ...................................................... 720/701
(58) Field of Search .......................... 720/701; 369/263, 369/264; 360/98.07

(56) References Cited

U.S. PATENT DOCUMENTS

| | | | | |
|---|---|---|---|---|
| 5,422,776 A | * | 6/1995 | Thorson et al. | 360/98.07 |
| 6,061,325 A | * | 5/2000 | Zaun | 369/264 |
| 6,198,715 B1 | * | 3/2001 | Kouno et al. | 369/263 |
| 6,731,588 B2 | * | 5/2004 | Han | 369/264 |

* cited by examiner

*Primary Examiner*—Tianjie Chen
(74) *Attorney, Agent, or Firm*—Birch Stewart Kolasch & Birch, LLP

(57) ABSTRACT

An auto-balancing apparatus for optical disk drives mainly includes a housing for holding a balance weight and a plurality of clamp mechanisms movable radially through the perimeter of the housing. The clamp mechanisms are engaged with a spindle of a spindle motor or the housing through elastic elements. When the spindle motor is not rotating, the balance weight is anchored at a desired position by the clamp mechanisms because of the elastic force of the elastic elements. When operating at high rotation speeds, the engagement force of the elastic elements exerted on the clamp mechanisms is smaller than the centrifugal force, and the balance weight may be moved freely to automatically reach a balanced condition. When operating at low rotation speeds, the server system drives the spindle motor to rotate at speeds faster than the critical rotation speed to reach a balanced condition, then slows down the rotation speed to allow the engagement force exerted on the clamp mechanisms to be greater than the centrifugal force and anchor the balance weight. Thus the auto-balancing apparatus can achieve a balance effect at low rotation speeds.

6 Claims, 4 Drawing Sheets

AUTO-BALANCING APPARATUS HAVING BALANCER CLAMPING MECHANISM FOR OPTICAL DISK DRIVES

FIELD OF THE INVENTION

The invention relates to an auto-balancing apparatus for optical disk drives, and particularly a novel auto-balancing apparatus for re-writable storage devices that provides an effective and reliable means of reducing vibration during optical disk drive operation caused by disks of unbalanced weight, to achieve accurate data reading or writing with smooth operation at high speeds.

BACKGROUND OF THE INVENTION

Rapid technological innovations and developments in information access and retrieval have greatly improved functionality of optical media in recent years. As a result, reading speed of optical disk drives, which are used as computer peripheral devices, has also made great progress. Nowadays, CD-ROMs with spindle motor rotation speed exceeding 10,000 RPM have become mainstream products on the market.

When the spindle motor operates at high speeds, the centrifugal wobbling force caused by unbalanced weight of the disk also increases. As a result, greater vibrations and noises will occur.

When the optical disk drives are put to practical use, excessive vibration and noise will make the optical read-write head unstable and make the optical disk drives unable to read data at their maximum rotation speed. The noise generated while optical disk drives are operating at high speeds also becomes an annoyance to many users.

Hence, to reduce vibration and ensure that optical disk drives are capable of reading data accurately and smoothly at their maximum rotation speed has become a critical issue faced by optical disk drive producers these days.

There are generally three conventional approaches to reduce the vibration caused by unbalanced weight of the disk when optical disk drives operate at high speeds: (1) increase the weight of the reading mechanism to reduce vibration; (2) utilize a dynamic absorber based on vibration theory to dampen vibration; (3) employ an auto-balancing system to decrease vibration.

While these three approaches can reduce vibration of optical disk drives to various degrees, the auto-balancing system achieves the best result. It utilizes an additional balance weight to decrease the triggering force of the vibration.

FIGS. 1 and 2 illustrate a conventional auto-balancing system, which is widely adopted for optical disk drives at present. The auto-balancing system includes an auto-balancing apparatus 11a located above (or below) a spindle motor 10a. The auto-balancing apparatus 11a includes a balance weight 12a (which is usually a plurality of steel balls) and a housing 13a (usually a circular element) for holding the balance weight 12a. Based on rotor dynamics, when the rotation speed of the spindle motor 10a is greater than the critical speed, the additional weight is moved to the location of the inverse phase of an unbalanced vector of the original optical disk 14a. As a result, the unbalanced weight of the optical disk 14a is offset, and vibration of the optical disk drive is reduced.

In practical applications, the balance weight of the auto-balancing apparatus is moved to the inverse phase of the unbalanced vector of the original optical disk only when the rotation speed exceeds the critical speed. For read-only optical disk drives, the spindle motors mostly operate at very high rotation speeds (generally greater than 6,000 RPM) and the balance weight can be moved to desired locations without problems.

However for re-writable optical disk drives, operation of the spindle motor for writing data often encounters certain conditions. One of these conditions is that the spindle motor rotation speed could drop to 200–500 RPM due to optical disk or laser power factors. At low rotation speeds, the balance weight becomes very unstable and tends to roll easily. It could lose the effect of offsetting the unbalanced weight. Moreover, the rolling generates noise or produces interference to the spindle motor, and makes the server system unable to control the motor to rotate at steady speeds. Hence conventional auto-balancing apparatus are not applicable to re-writable optical disk drives.

SUMMARY OF THE INVENTION

In view of the foregoing disadvantages, the primary object of the invention is to provide an auto-balancing apparatus for optical disk drives to expand the conventional auto-balancing apparatus used with read-only storage devices to re-writable storage devices such as CD-ROM, DVD-R/RW and DVD-RAM, and the like. The re-writable storage devices can then read data at high speeds, and also can write data at low operating speeds.

To achieve the foregoing objects, the auto-balancing apparatus of the invention includes a balance weight, a housing for holding the balance weight, and a clamp mechanism. The clamp mechanism is engaged with the spindle of a spindle motor or the housing through an elastic element.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENTS

Figures 1, 2:
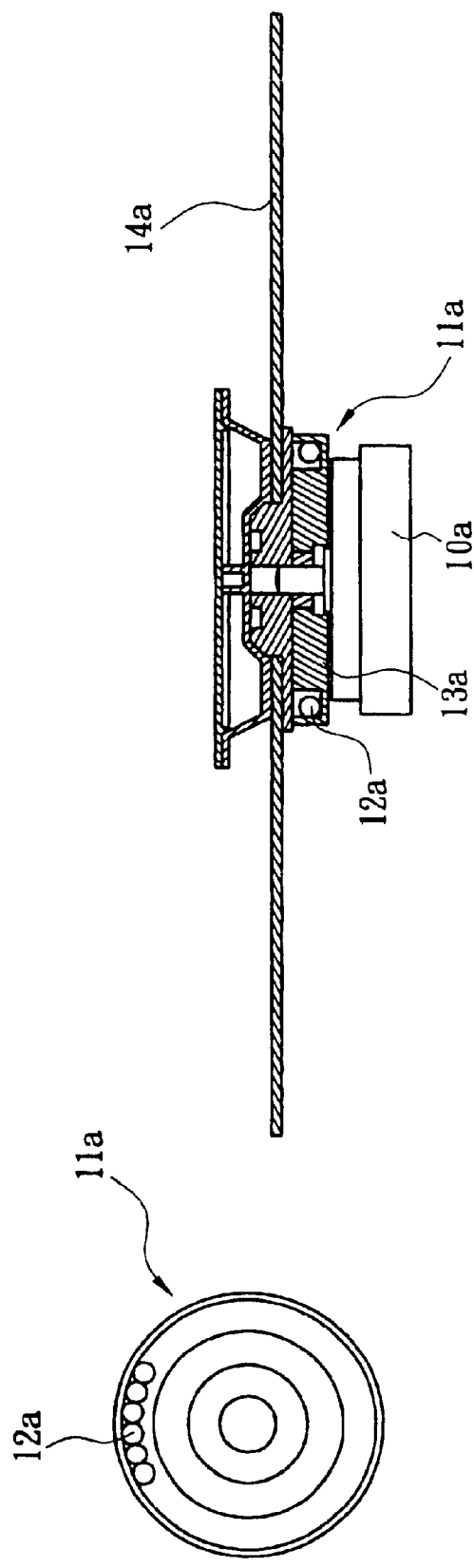
FIG. 1 is a top view of a conventional auto-balancing apparatus.
FIG. 2 is a cross section of a conventional auto-balancing apparatus.
Figure 3:
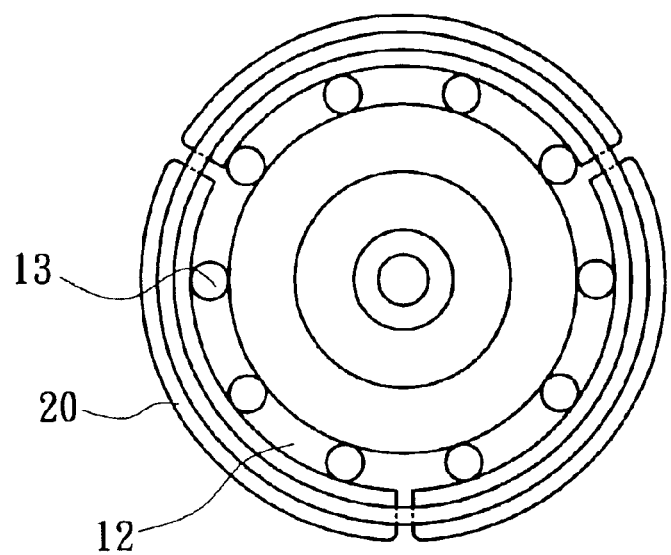
FIG. 3 is a top view of the invention.
Figure 4:
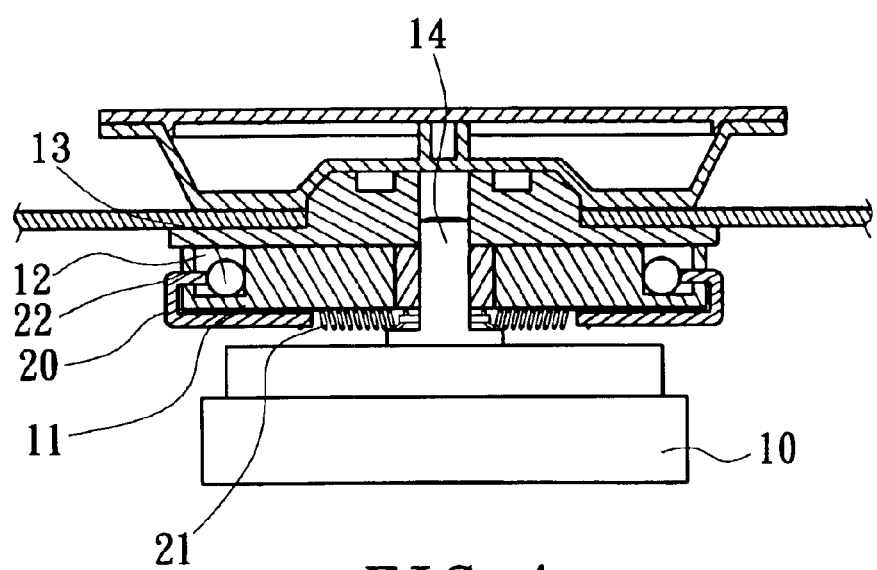
FIG. 4 is a cross section of the invention.

Referring to FIGS. 3 and 4, the auto-balancing apparatus for optical disk drives of the invention is located above (or below) a spindle motor 10 and includes a housing 11, which may be rotated synchronously with the spindle motor 10. The housing 11 is circular and has a circular orbit 12 around its spindle axis. The orbit 12 is an annular groove and holds thereon at least one balance weight (steel ball) 13.

Figure 7:
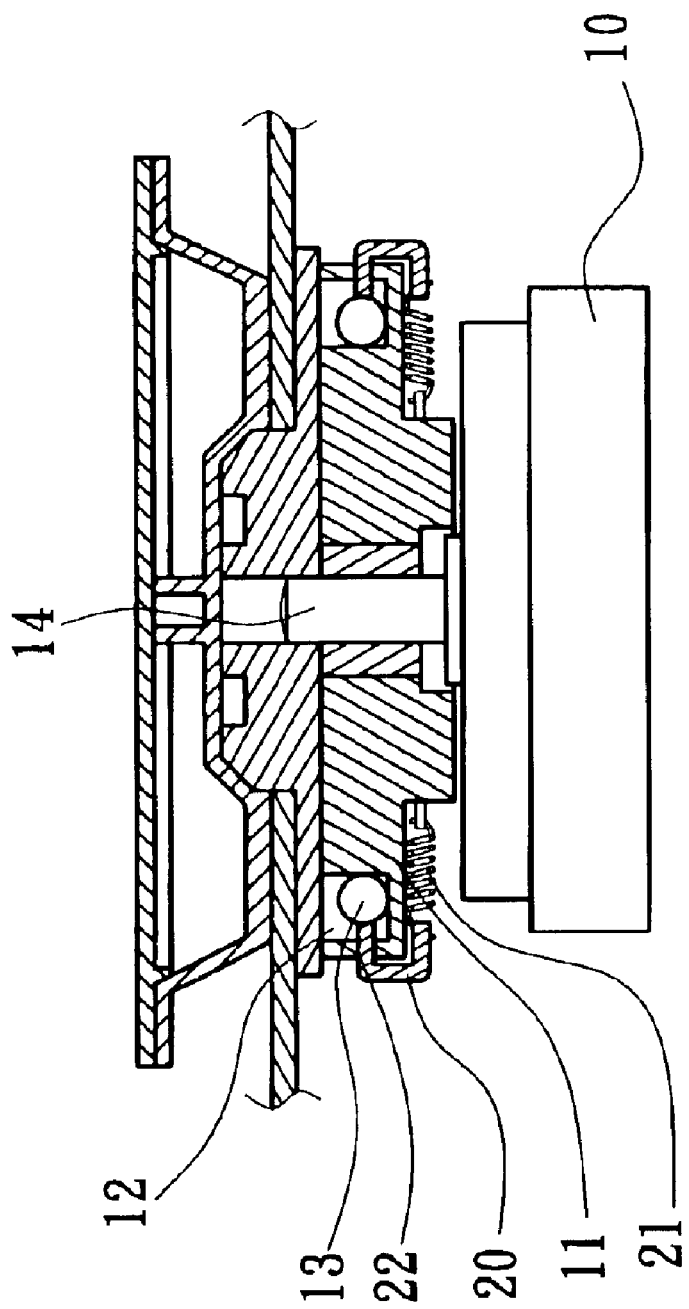
FIG. 7 is a cross section of another embodiment of the invention.

In an embodiment of the invention, the perimeter of the housing 11, which holds the balance weight 13, is coupled with a plurality of clamp mechanisms 20 that are movable radially. The clamp mechanisms 20 are respectively engaged with a spindle 14 of the spindle motor 10 or the housing 11 (as shown in FIG. 7) through an elastic element 21 (such as a spring). When the spindle motor 10 is stationary, the clamp mechanisms 20 are pulled by the elastic element 21 through a slot 22 formed on the perimeter of the housing 11 to clamp the balance weight 13. Thus the balance weight 13 may be anchored at a selected location without rolling freely. The clamping and releasing of the balance weight 13 is controlled by the elastic force of the elastic centrifugal force incurred by the clamp mechanisms 20.

Figure 5:
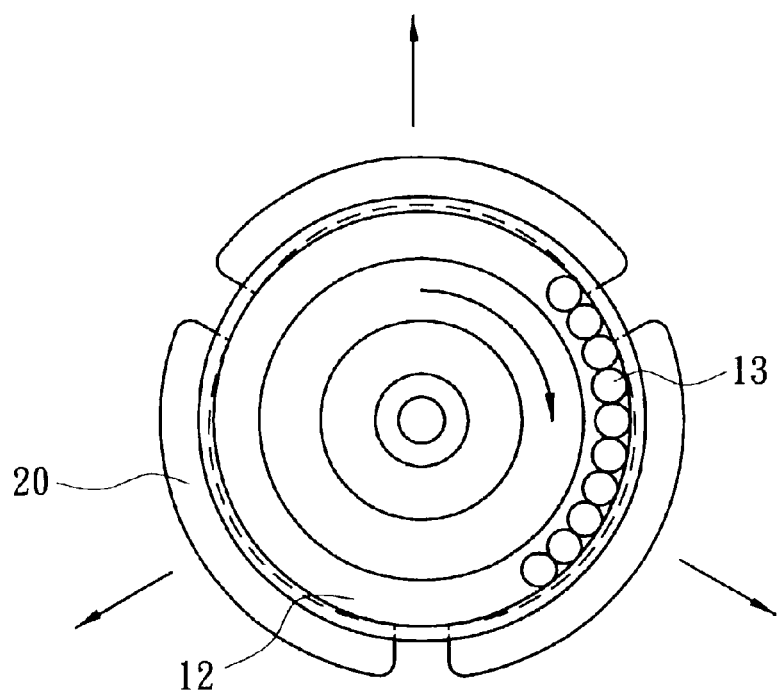
FIG. 5 is a top view of the invention in another condition.
Figure 6:
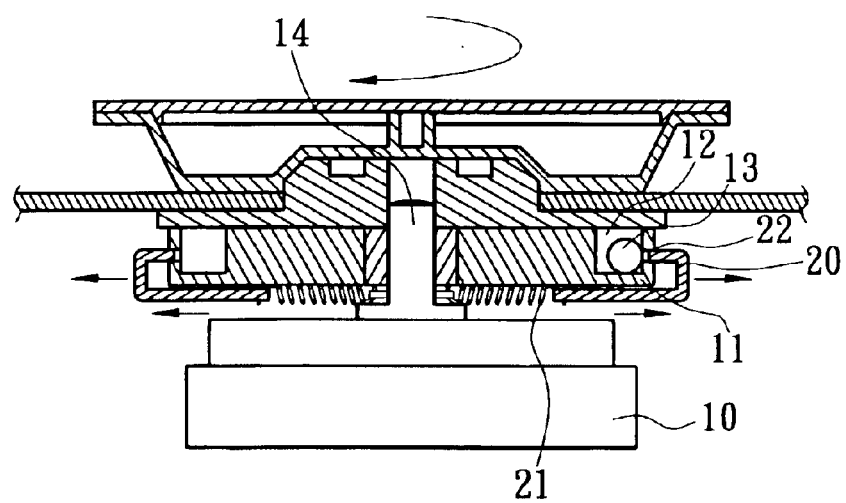
FIG. 6 is a cross section of the invention in another condition.

When an optical disk is placed in the optical disk drive and the spindle motor 10 is activated and rotated, the clamp mechanisms 20 will subjected to a centrifugal force and offset the engaging force of the elastic element 21. The engaging elastic force may be made smaller than the centrifugal force incurred by the clamp mechanisms 20 before reaching a critical rotation speed. Hence, the balance weight 13 may be thrown away by the centrifugal force to move freely (as shown in FIGS. 5 and 6). When rotation is continuously accelerated, the balance weight 13 is spun until moved to a balanced position. This operation is essentially like the conventional auto-balancing apparatus for reaching a balanced condition at high speeds.

When the optical disk drive performs writing operations at low speeds, or the optical disk has quality problems and has to operate at low speeds, the auto-balancing apparatus of the invention may provide the following two approaches:

1. Directly drive the optical disk drive below the critical rotation speed. As the rotation speed is not very fast, the unbalanced weight does not become a hindrance to read or write operations. Moreover, the balance weight 13 is harnessed by the clamp mechanisms 20 and cannot roll freely. Hence, writing operation can be performed without difficulty, and no noise or unsteady rotation occurs.
2. When the server system determines that low speed operation is required, the spindle motor 10 is driven to rotate at a speed faster than the critical rotation speed, so that the balance weight 13 is moved to a desired and balanced position. Then the rotation speed of the spindle motor 10 is tuned down below the critical rotation speed until the engaging force incurred by the clamp mechanisms 20 is greater than the centrifugal force. Then the balance weight 13 will be harnessed by the clamp mechanisms 20 without moving freely. As the balance weight 13 is located at the desired balanced position, rotation vibration is smaller. In addition, as the balance weight 13 is harnessed by the clamp means 20 without rolling freely, read or write operations can be performed smoothly without generating noise or unsteady rotation.

By means of the aforesaid constructions, the auto-balancing apparatus of the invention can be adopted for re-writable optical disk drives at all- possible operation speeds, and can overcome the disadvantages occurring with the conventional techniques. Thus the re-writable optical disk drives can read data smoothly at high speeds, and can also steadily and reliably perform writing operations.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An auto-balancing apparatus for an optical disk drive comprising:
   a balance weight; and
   a housing for holding the balance weight and a clamp means;
   wherein the clamp means is selectively engaged with a spindle of a spindle motor or the housing through an elastic element and is pulled by the elastic element to clamp the balance weight when the spindle motor is stationary.
2. The auto-balancing apparatus of claim 1, wherein the housing has a perimeter which has a slot to allow the clamp means passing through.
3. The auto-balancing apparatus of claim 1, wherein the housing is circular and has a circular orbit for holding the balance weight.
4. The auto-balancing apparatus of claim 1, wherein the clamp means is movable radially.
5. The auto-balancing apparatus of claim 1, wherein the clamp means is subject to centrifugal force and offsets an engaging force of the elastic element when the spindle motor rotates.
6. The auto-balancing apparatus of claim 5, wherein the engaging force is smaller than the centrifugal force incurred by the clamp means when the spindle motor is above a critical rotation speed.

* * * * *